（12） United States Patent
Reuther

(10) Patent No.: US 6,227,584 B1
(45) Date of Patent: May 8, 2001

(54) STRING OF LIGHTS HANGING APPARATUS

(76) Inventor: Sandra Lee Reuther, 22308 S. Eastcliff Dr., Joliet, IL (US) 60431-6609

( * ) Notice: Subject to any disclaimer, the term of this patent is extended or adjusted under 35 U.S.C. 154(b) by 0 days.

(21) Appl. No.: 09/535,035

(22) Filed: Mar. 24, 2000

Related U.S. Application Data

(60) Provisional application No. 60/127,056, filed on Mar. 31, 1999.

(51) Int. Cl.[7] .................................................. B25J 1/00
(52) U.S. Cl. ........................................ 294/19.1; 294/104
(53) Field of Search .............................. 294/19.1, 22, 23, 294/24, 50.8, 50.9, 104; 56/328.1, 332, 333

(56) References Cited

U.S. PATENT DOCUMENTS

| | | | | |
|---|---|---|---|---|
| 1,120,735 | * | 12/1914 | Moyer | 294/22 |
| 1,337,398 | * | 4/1920 | Fleckner | 294/19.1 |
| 1,914,246 | * | 6/1933 | Entrikin | 294/19.1 |
| 2,720,409 | * | 10/1955 | Griffith | 294/19.1 |
| 4,854,626 | * | 8/1989 | Duke | 294/19.1 |
| 5,553,905 | * | 9/1996 | Bentivegna | 294/19.1 X |
| 5,713,617 | * | 2/1998 | Marinaro | 294/19.1 X |
| 5,823,590 | * | 10/1998 | Forrest et al. | 294/19.1 |
| 5,941,586 | * | 8/1999 | Fann | 294/19.1 |

* cited by examiner

*Primary Examiner*—Johnny D. Cherry
(74) *Attorney, Agent, or Firm*—Goldstein & Canino

(57) ABSTRACT

A string of lights hanging apparatus including a telescoping handle comprised of a lower section, an upper section, and an intermediate section therebetween. A clamping mechanism is secured to a free end of the upper section of the telescoping handle. The clamp mechanism includes a fixed arm. The fixed arm extends outwardly from the handle. The clamping mechanism includes a pivoting arm. An inner end of the pivoting arm is pivotally coupled with an inner end of the fixed arm. A spring extends between the pivoting arm and the fixed arm for biasing the pivoting arm outwardly from the fixed arm. A trigger mechanism is secured to the lower section of the telescoping handle. The trigger mechanism includes a cable extending outwardly therefrom. A free end of the cable is secured to the pivoting arm of the clamping mechanism whereby inward pressure of the trigger mechanism will cause the pivoting arm to compress the spring and engage the fixed arm.

5 Claims, 2 Drawing Sheets

STRING OF LIGHTS HANGING APPARATUS

CROSS REFERENCES AND RELATED SUBJECT MATTER

This application relates to subject matter contained in provisional patent application Ser. No. 60/127,056, filed in the United States Patent & Trademark Office on Mar. 31, 1999.

BACKGROUND OF THE INVENTION

The present invention relates to a string of lights hanging apparatus and more particularly pertains to aiding a person in hanging strings of lights.

Presently, people use a ladder in order to hang strings of lights from Christmas trees and other high places. Ordinarily the use of such a ladder presents a danger when hanging the lights from Christmas trees. This is because of the conical shape of the Christmas tree which forces the person of the ladder to lean inwardly in order to reach the narrow top section of the tree. This presents a great risk of a fall and possible injury. Sometimes people merely throw the lights up at the top section of the tree in order to avoid using a ladder. This often results in the lights looking disorganized and also rarely staying in place.

The present invention seeks to provide a solution to this problem by providing a device that will allow people to hang strings of lights from high places without risk of injury.

The use of decoration hanging systems is known in the prior art. More specifically, decoration hanging systems heretofore devised and utilized for the purpose of hanging decorations are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,793,646 to Michaud, Jr. discloses an adjustable handle and arm assembly, which incorporates at least two elongated, telescopically engaged tube members, which are fashioned into various lengths. U.S. Pat. No. 5,553,905 to Bentivegna discloses an apparatus for handling ornaments and other objects which includes an elongated handle having opposed ends and a hook shaped applicator. U.S. Pat. No. 5,560,975 to Casper discloses a decoration system that enables decorative articles to be hung from high places with safety. The decorating system includes a dual adapter. U.S. Pat. No. 5,713,617 to Marinaro discloses a combination pole for hanging decorative lights and window washing. The pole can be used for hanging and removing lights suspended from high trees and buildings.

While these devices fulfill their respective, particular objective and requirements, the aforementioned patents do not describe a string of lights hanging apparatus for aiding a person in hanging strings of lights.

In this respect, the string of lights hanging apparatus according to the present invention substantially departs from the conventional concepts and designs of the prior art, and in doing so provides an apparatus primarily developed for the purpose of aiding a person in hanging strings of lights.

Therefore, it can be appreciated that there exists a continuing need for new and improved string of lights hanging apparatus which can be used for aiding a person in hanging strings of lights. In this regard, the present invention substantially fulfills this need.

SUMMARY OF THE INVENTION

In the view of the foregoing disadvantages inherent in the known types of decoration hanging systems now present in the prior art, the present invention provides an improved string of lights hanging apparatus. As such, the general purpose of the present invention, which will be described subsequently in greater detail, is to provide a new and improved string of lights hanging apparatus and method which has all the advantages of the prior art and none of the disadvantages.

To attain this, the present invention essentially comprises a telescoping handle comprised of a lower section, an upper section, and an intermediate section therebetween. Each of the sections are adjustably coupled together by adjustment collars. A clamping mechanism is secured to a free end of the upper section of the telescoping handle. The clamp mechanism includes a fixed arm having teeth disposed on an inner surface thereof. The fixed arm extends outwardly from the handle at an essentially orthogonal relationship with respect thereto. The clamping mechanism includes a pivoting arm having teeth disposed on an inner surface thereof. An inner end of the pivoting arm is pivotally coupled with an inner end of the fixed arm. A spring extends between the pivoting arm and the fixed arm for biasing the pivoting arm outwardly from the fixed arm. A trigger mechanism is secured to the lower section of the telescoping handle. The trigger mechanism includes a cable extending outwardly therefrom. A free end of the cable is secured to the pivoting arm of the clamping mechanism whereby inward pressure of the trigger mechanism will cause the pivoting arm to compress the spring and engage the fixed arm.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved string of lights hanging apparatus which has all the advantages of the prior art decoration hanging systems and none of the disadvantages.

It is another object of the present invention to provide a new and improved string of lights hanging apparatus which may be easily and efficiently manufactured and marketed.

It is a further object of the present invention to provide a new and improved string of lights hanging apparatus which is of durable and reliable construction.

An even further object of the present invention is to provide a new and improved string of lights hanging apparatus which is susceptible of a low cost of manufacture with regard to both materials and labor, and which accordingly is then susceptible of low prices of sale to the consuming public, thereby making such a string of lights hanging apparatus economically available to the buying public.

Even still another object of the present invention is to provide a new and improved string of lights hanging apparatus for aiding a person in hanging strings of lights.

Lastly, it is an object of the present invention to provide a new and improved string of lights hanging apparatus including a telescoping handle comprised of a lower section, an upper section, and an intermediate section therebetween. A clamping mechanism is secured to a free end of the upper section of the telescoping handle. The clamp mechanism includes a fixed arm. The fixed arm extends outwardly from the handle. The clamping mechanism includes a pivoting arm. An inner end of the pivoting arm is pivotally coupled with an inner end of the fixed arm. A spring extends between the pivoting arm and the fixed arm for biasing the pivoting arm outwardly from the fixed arm. A trigger mechanism is secured to the lower section of the telescoping handle. The trigger mechanism includes a cable extending outwardly therefrom. A free end of the cable is secured to the pivoting arm of the clamping mechanism whereby inward pressure of the trigger mechanism will cause the pivoting arm to compress the spring and engage the fixed arm.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
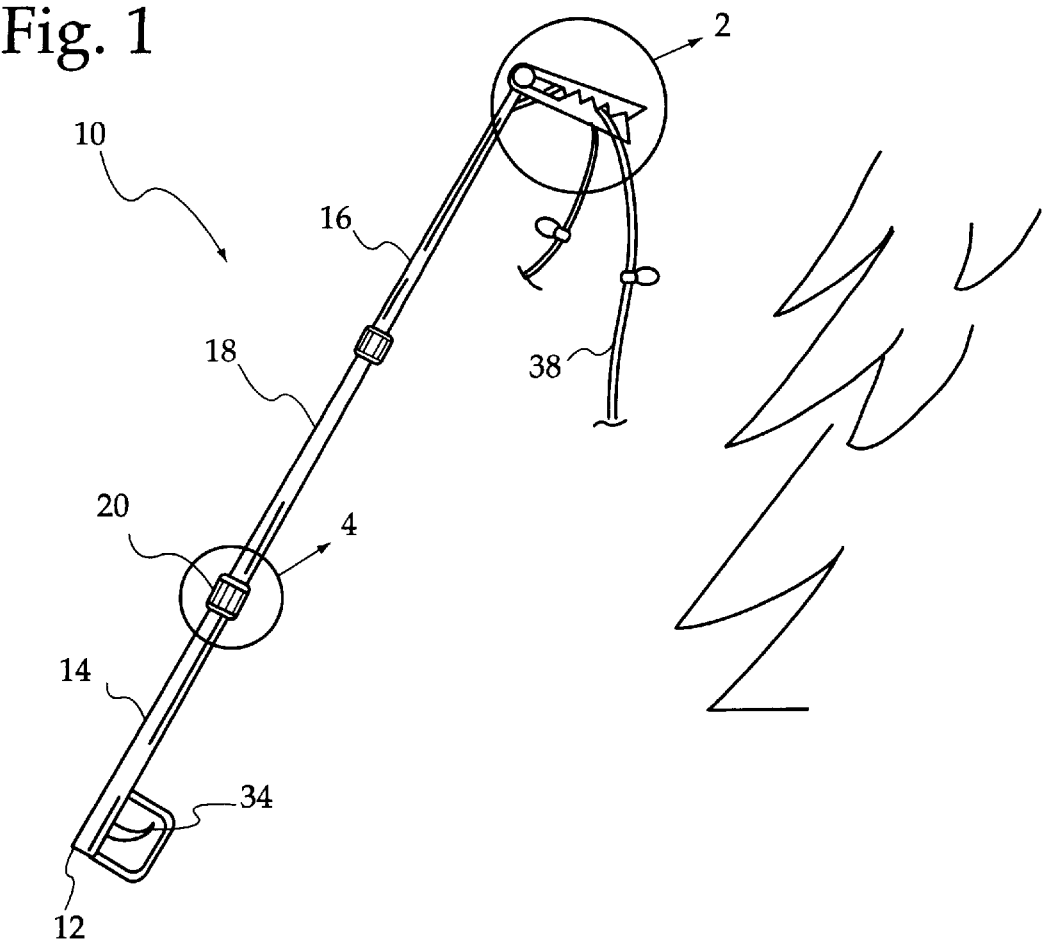
FIG. 1 is a perspective view of the preferred embodiment of the string of lights hanging apparatus constructed in accordance with the principles of the present invention.
Figure 2:
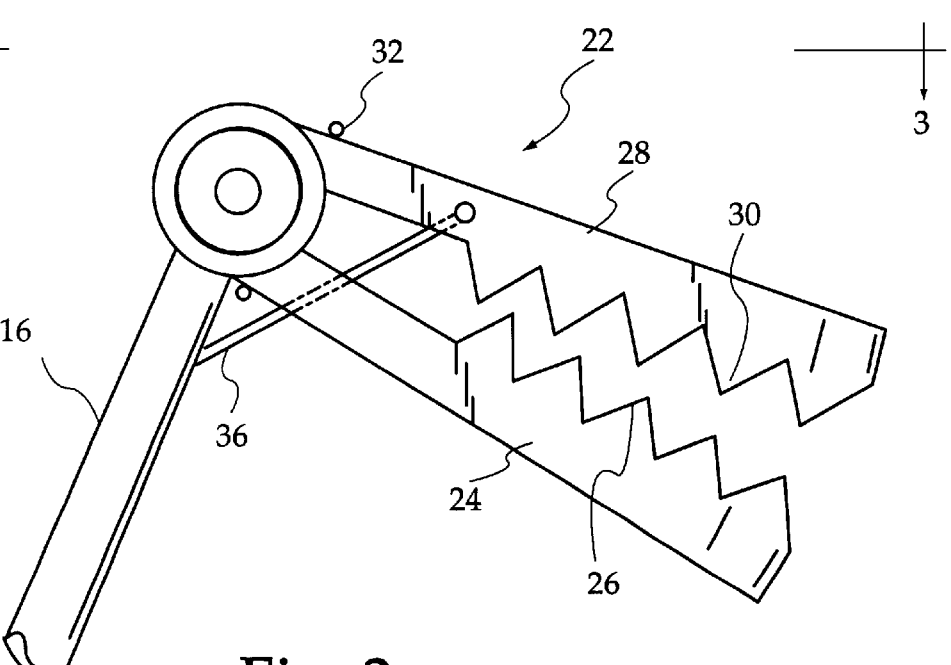
FIG. 2 is a sectional side view of the clamping mechanism of the present invention as taken from circle 2 of FIG. 1.
Figure 3:
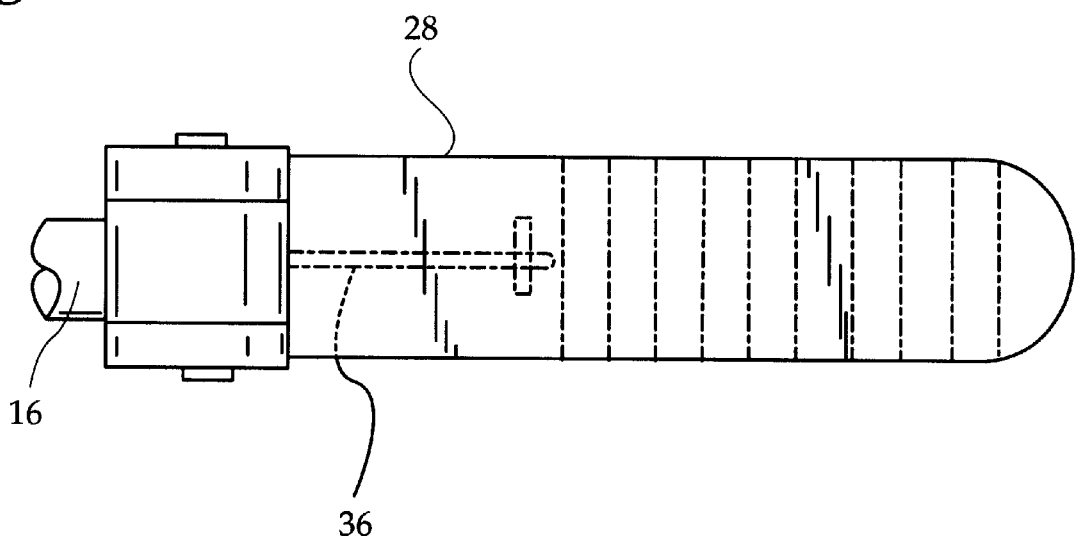
FIG. 3 is a top plan view of the clamping mechanism as taken along line 3—3 of FIG. 2.
Figure 4:
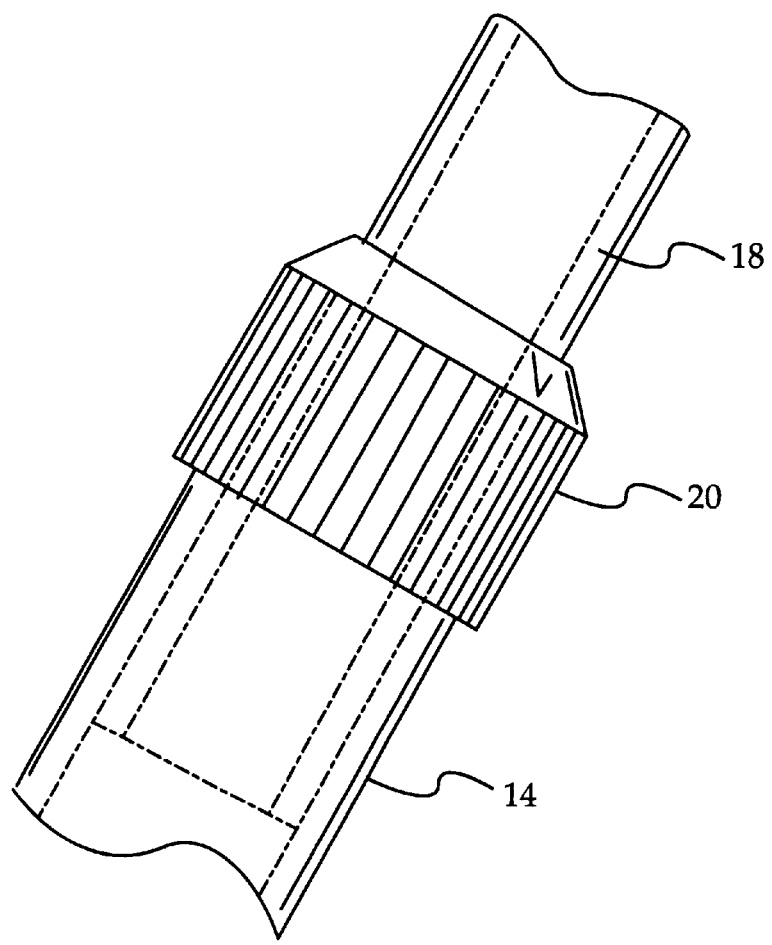
FIG. 4 is a sectional side view of the adjustment collar of the telescoping handle of the present invention as taken from circle 4 of FIG. 1.

With reference now to the drawings, and in particular, to FIGS. 1 through 4 thereof, the preferred embodiment of the new and improved string of lights hanging apparatus embodying the principles and concepts of the present invention and generally designated by the reference number 10 will be described.

Specifically, it will be noted in the various Figures that the device relates to a string of lights hanging apparatus for aiding a person in hanging strings of lights. In its broadest context, the device consists of a telescoping handle, a clamping mechanism, and a trigger mechanism. Such components are individually configured and correlated with respect to each other so as to attain the desired objective.

The telescoping handle 12 is comprised of a lower section 14, an upper section 16, and an intermediate section 18 therebetween. Note FIG. 1. Each of the sections is adjustably coupled together by adjustment collars 20. Note FIG. 4. By loosening the adjustment collars 20, the handle 12 can be adjusted to a length suitable for the application.

The clamping mechanism 22 is secured to a free end of the upper section 16 of the telescoping handle 12. The clamp mechanism 22 includes a fixed arm 24 having teeth 26 disposed on an inner surface thereof. The fixed arm 24 extends outwardly from the handle 12 at an essentially orthogonal relationship with respect thereto. Note FIG. 2. The clamping mechanism 22 includes a pivoting arm 28 having teeth 30 disposed on an inner surface thereof. An inner end of the pivoting arm 28 is pivotally coupled with an inner end of the fixed arm 24. Note FIG. 2. A spring 32 extends between the pivoting arm 28 and the fixed arm 24 for biasing the pivoting arm 28 outwardly from the fixed arm 24. Note FIG. 2.

The trigger mechanism 34 is secured to the lower section 14 of the telescoping handle 12. The trigger mechanism 34 includes a cable 36 extending outwardly therefrom. A free end of the cable 36 is secured to the pivoting arm 28 of the clamping mechanism 22 whereby inward pressure of the trigger mechanism 34 will cause the pivoting arm 28 to compress the spring 32 and engage the fixed arm 24. This will allow for the string of lights 38 to be engaged by the device 10 and positioned accordingly. Note FIG. 1. Thus, the user can place the string of lights 38 between the arms 24,28 of the clamping mechanism 22 and then adjust the height of the handle 12 to allow the user to extend the lights 38 to the area where the lights 38 are to be placed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A string of lights hanging apparatus for aiding a person in hanging strings of lights comprising, in combination:
   a telescoping handle comprised of a lower section, an upper section, and an intermediate section therebetween, each of the sections being adjustably coupled together by adjustment collars;
   a clamping mechanism secured to a free end of the upper section of the telescoping handle, the clamp mechanism including a fixed arm having teeth disposed on an inner surface thereof, the fixed arm extending outwardly from the handle at an essentially orthogonal relationship with respect thereto, the clamping mechanism including a pivoting arm having teeth disposed on an inner surface thereof, an inner end of the pivoting arm being pivotally coupled with an inner end of the fixed arm, a spring extending between the pivoting arm and the fixed arm for biasing the pivoting arm outwardly from the fixed arm;

a trigger mechanism secured to the lower section of the telescoping handle, the trigger mechanism including a cable extending outwardly therefrom, a free end of the cable secured to the pivoting arm of the clamping mechanism whereby inward pressure of the trigger mechanism will cause the pivoting arm to compress the spring and engage the fixed arm.

2. A string of lights hanging apparatus for aiding a person in hanging strings of lights comprising, in combination:

a telescoping handle comprised of a lower section, an upper section, and an intermediate section therebetween;

a clamping mechanism secured to a free end of the upper section of the telescoping handle, the clamp mechanism including a fixed arm extending outwardly from the handle, the clamping mechanism including a pivoting arm, an inner end of the pivoting arm being pivotally coupled with an inner end of the fixed arm, a spring extending between the pivoting arm and the fixed arm for biasing the pivoting arm outwardly from the fixed arm;

a trigger mechanism secured to the lower section of the telescoping handle, the trigger mechanism including a cable extending outwardly therefrom, a free end of the cable secured to the pivoting arm of the clamping mechanism whereby inward pressure of the trigger mechanism will cause the pivoting arm to compress the spring and engage the fixed arm.

3. The string of lights hanging apparatus as set forth in claim 2 wherein each of the sections of the telescoping handle are adjustably coupled together by adjustment collars.

4. The string of lights hanging apparatus as set forth in claim 2 wherein the fixed arm and the pivoting arm each have teeth disposed on an inner surface thereof.

5. The string of lights hanging apparatus as set forth in claim 2 wherein the fixed arm extends outwardly from the handle at an essentially orthogonal relationship with respect thereto.

* * * * *